United States Patent [19]

Efner et al.

[11] Patent Number: 5,430,079

[45] Date of Patent: Jul. 4, 1995

[54] GLASS-REINFORCED GRAFTED BRANCHED HIGHER ALPHA-OLEFIN POLYMERS

[75] Inventors: Howard F. Efner; Edwin Boudreaux, Jr.; Mary J. Hagenson, all of Bartlesville, Okla.

[73] Assignee: Phillips Petroleum Company, Bartlesville, Okla.

[21] Appl. No.: 182,881

[22] Filed: Jan. 18, 1994

Related U.S. Application Data

[60] Division of Ser. No. 967,300, Oct. 26, 1992, Pat. No. 5,308,893, which is a continuation-in-part of Ser. No. 674,646, Mar. 22, 1991, abandoned.

[51] Int. Cl.$^6$ .................. C08L 51/06; C08L 63/02
[52] U.S. Cl. .................. 523/436; 428/292; 523/437; 525/71; 525/72; 525/119; 525/120
[58] Field of Search .............. 523/436, 437; 428/292; 525/71, 72, 78, 80, 119, 120, 101

[56] References Cited

U.S. PATENT DOCUMENTS

| | | | |
|---|---|---|---|
| 4,240,944 | 12/1980 | Temple | 260/29.6 NR |
| 4,247,667 | 1/1981 | Nojiri et al. | 525/254 |
| 4,358,501 | 11/1982 | Temple | 428/268 |
| 4,374,177 | 2/1983 | Hsu et al. | 428/392 |
| 4,413,085 | 11/1983 | Temple | 524/321 |
| 4,542,065 | 9/1985 | Gaa | 428/391 |
| 4,550,103 | 10/1985 | Kishida et al. | 523/436 |
| 4,615,946 | 10/1986 | Temple | 428/361 |
| 4,720,516 | 1/1988 | Kishida et al. | 523/436 |
| 4,798,445 | 1/1989 | Yamamoto | 350/96 |
| 4,857,576 | 8/1989 | Kochi et al. | 524/409 |
| 4,888,394 | 12/1989 | Boudreaux, Jr. | 525/285 |
| 4,937,284 | 6/1990 | Bergstrom | 252/57 |
| 4,975,509 | 12/1990 | Joslyn et al. | 526/279 |

OTHER PUBLICATIONS

Lee & Neville, Handbook of Epoxy Resins, (1967) pp. 2-13 through 2-14.

CertainTeed product bulletin, "Chopped Strand 93B", published by CertainTeed Corp. P.O. Box 860, Valley Forge, Pa., 19482, Jan. 1985.

CertainTeed product bulletin, "Chopped Strand 91B", published by CertainTeed Corp. P.O. Box 860, Valley Forge, Pa., 19482, Jan. 1985.

PPG Industries, Inc., product bulletin, "Type 1156 Chopped Strand", published by PPG Industries, Inc., One PPG Place, Pittsburgh, Pa., 15272, Jan. 1984.

CertainTeed product bulletin, "Chopped Strand 930", published by CertainTeed Corp. P.O. Box 860, Valley Forge, Pa., 19482, Jan. 1985.

CertainTeed product bulletin, "Chopped Strand 967", published by CertainTeed Corp. P.O. Box 860, Valley Forge, Pa., 19482, Jan., 1985.

*Primary Examiner*—Melvyn I. Marquis
*Assistant Examiner*—D. Aylward
*Attorney, Agent, or Firm*—Morrison Bennett; K. K. Brandes

[57] ABSTRACT

Compositions of stabilized stereoregular polymer of branched higher alpha-olefins, grafting compounds, free radical generators, glass and epoxy resins and/or epoxy-functional silanes and/or hydroxy functional compounds are provided as well as methods for making these compounds and articles thereof.

16 Claims, No Drawings

# GLASS-REINFORCED GRAFTED BRANCHED HIGHER ALPHA-OLEFIN POLYMERS

This application is a divisional of application Ser. No. 07/967,300, filed Oct. 27, 1992, U.S. Pat. No. 5,308,893 which is a continuation-in-part of application Ser. No. 07/674,646, filed Mar. 22, 1991 now abandoned.

FIELD OF THE INVENTION

This invention relates to glass-reinforced branched higher alpha-olefins.

BACKGROUND OF THE INVENTION

Polyolefins tend to have excellent physical and chemical properties. Improvement of polymer properties is a dominant factor in the development and production of olefin polymers. Several methods have been employed to improve various polymer properties. The prior art teaches that reinforcing agents, such as glass fibers, can be incorporated into the polymer to improve the mechanical properties and/or the heat resistance of the polymer. However, merely mixing the glass fibers and the polyolefins together can result in weak bonding between the glass fibers and the polyolefin. One solution is to have a more bondable component grafted onto the polymers to facilitate reinforcement with glass fibers and other generally infusible reinforcing agents.

Polymers with relatively high melting points, such as stereoregular polymers of branched, higher alpha-olefins, have been developed. These polymers are useful in high temperature applications, such as microwave packaging. Improving the performance and/or properties of these polymers could expand the variety of uses of these polymers.

Polymers of branched higher alpha-olefins have been modified with grafting reactions to incorporate functional chemical moieties to improve the adhesion between the alpha-olefin matrix and the glass reinforcement as has been disclosed in U.S. Pat. No. 4,888,394, Dec. 19, 1989.

Glass fiber reinforcement products are usually sized either during the fiber formation process or in a post-treatment. Sizing compositions for use in treating glass fibers usually contain a lubricant, which provides the protection for the glass fiber strand; a film-former or binder that gives the glass fiber strand integrity and workability; a coupling agent that provides better adhesion between the glass fiber strand and the polymeric materials that are reinforced with the glass fiber strand; and other additives such as emulsifiers, wetting agents, nucleating agents, and the like. Various sizing compositions have been developed for glass fiber reinforcements to provide improved adhesion between various polymeric materials and the glass fiber. Sizing compositions are known for treating glass fibers for improved adhesion between the glass fiber strand and relatively low melting point polyolefins, such as polyethylene and polypropylene. The polyolefin may be modified partially or entirely with an unsaturated carboxylic acid or derivative thereof. The prior art does not teach sizing compositions for treating glass fibers for improved adhesion between glass fibers and stereoregular polymers of branched higher alpha-olefins or stereoregular polymers of branched higher alpha-olefins which have been modified with unsaturated silanes, carboxylic acids, or derivatives thereof.

SUMMARY OF THE INVENTION

It is an object of this invention to provide glass-reinforced branched higher alpha-olefins with improved adhesion between the higher alpha-olefin matrix and the glass reinforcement.

It is another object of this invention to provide methods for making glass-reinforced branched higher alpha-olefins with improved adhesion between the higher alpha-olefin matrix and the glass reinforcement.

It is an object of this invention to provide glass-reinforced thermoplastic materials from which products with improved properties can be made.

It is another object of this invention to provide methods for making glass-reinforced thermoplastic materials from which products with improved properties can be made.

In one embodiment of this invention a composition comprises:
(a) a stereoregular polymer of branched higher alpha-olefins which has been stabilized with at least one hindered phenol;
(b) a grafting compound selected from the group consisting of vinyl-polymerizable, unsaturated, hydrolyzable silanes; carboxylic acids; carboxylic acid derivatives; carboxylic acid anhydrides; carboxylic acid anhydride derivatives; and mixtures thereof;
(c) a free radical generator;
(d) glass; and
(e) at least one epoxy resin. Another embodiment of this invention is a composition comprising:
(a) a stereoregular polymer of branched higher alpha-olefins which has been stabilized with at least one hindered phenol;
(b) a grafting compound selected from the group consisting of vinyl-polymerizable, unsaturated, hydrolyzable silanes; carboxylic acids; carboxylic acid derivatives; carboxylic acid anhydrides; carboxylic acid anhydride derivatives; and mixtures thereof;
(c) a free radical generator;
(d) glass; and
(e) at least one epoxy-functional silane.

In yet another embodiment of this invention a composition comprises:
(a) a stereoregular polymer of branched higher alpha-olefins which has been stabilized with at least one hindered phenol;
(b) a grafting compound selected from the group consisting of vinyl-polymerizable, unsaturated, hydrolyzable silanes; carboxylic acids; carboxylic acid derivatives; carboxylic acid anhydrides; carboxylic acid anhydride derivatives; and mixtures thereof;
(c) a free radical generator;
(d) glass;
(e) at least one epoxy resin; and
(f) at least one epoxy-functional silane.

Any of the three foregoing embodiments of this invention may optionally contain hydroxy-functional compounds.

In accordance with this invention methods are provided for making the compositions of this invention.

Also in accordance with this invention articles made from the compositions of the invention are provided.

DETAILED DESCRIPTION OF THE INVENTION

The mechanical and thermal properties and property retention characteristics of stereoregular polymers of branched higher alpha-olefins are improved by compounding with glass fibers. These polymers are further improved by chemical coupling of the polymer matrix to the glass reinforcing fibers. The resultant compounds have excellent electrical properties, high strength, and good thermal and chemical resistance, which are beneficial in a variety of automotive and electrical applications. For example, products made with the glass-reinforced polymers of this invention have exhibited significantly higher heat deflection temperatures than products made with other glass-reinforced polymers.

Surprisingly excellent mechanical and thermal properties can be obtained by (a) modifying stabilized, stereoregular polymers of branched higher alpha-olefin polymers with unsaturated silanes, carboxylic acids, and/or carboxylic acid anhydrides in the presence of a free radical generator in the polymer melt, and then (b) reinforcing these modified polymers with glass which has been sized with compositions which contain at least one epoxy resin or at least one epoxy-functional silane or both at least one epoxy resin and at least one epoxy-functional silane. It has also been discovered that further unexpected improvements in properties can be obtained by (c) adding hydroxy-functional compounds to the inventive compositions.

Polymers

Polymers considered suitable for use in this invention are olefinic polymers which have a melting point higher than about 180° C., more preferably, a melting point of greater than about 190° C. Polymers produced from linear monomers, such as ethylene, propylene, butene, and hexene, usually have lower melting points than polymers of branched higher alpha-olefins. Thus, the polymers useful in this invention are homopolymers and copolymers of branched higher alpha-olefins. The preferred alpha-olefin monomers have from about 4 to 12 carbon atoms. Exemplary monomers include, but are not limited to, 3-methyl-1-butene (3MB1), 3-methyl-1-pentene (3MP1), 4-methyl-1-pentene (4MP1), 4-methyl-1-hexene (4MH1), 3,3-dimethyl-1-butene (3,3DMB1), 4,4-dimethyl-1-hexene (4,4DMH1), 3-ethyl-1-hexene (3EH1) and other similar monomers. Most preferably, polymers of 4MP1, also called polymethylpentene (PMP), and 3MB1, also called polymethylbutene (PMB), are utilized in this invention. Table I gives the approximate melting point of each homopolymer listed above.

TABLE I

| Melting Points of Some of the Polymers Useful in This Invention | |
|---|---|
| Polymerized Monomer | Approximate Melting Temperature, °C. |
| 3-methyl-1-butene | 300 |
| 3-methyl-1-pentene | 370 |
| 4-methyl-1-pentene | 240 |
| 4-methyl-1-hexene | 196 |
| 3-ethyl-1-hexene | 425 |
| 3,3-dimethyl-1-butene | 400 |
| 4,4-dimethyl-1-hexene | 350 |

The term "polymer", as used in this disclosure, includes homopolymers, as well as copolymers. Copolymers comprise the product resulting from combining a branched higher alpha-olefin with any other olefin monomer or monomers. For example, a branched higher alpha-olefin can be polymerized in the presence of, or in series with, one or more olefin monomers. Generally, applicable comonomers have from about 2 to about 18 carbon atoms and preferably, have from about 8 to about 16 carbon atoms. Most preferably, the comonomer or comonomers are linear alpha-olefins. Longer chain linear olefins are preferred in that they are easier to copolymerize with branched higher alpha-olefins and can impart increased clarity, stability, and impact strength to the resultant polymer. Exemplary comonomers include, but are not limited to, 1-octene, 1-decene, 1-dodecene, 1-tetradecene, 1-hexadecene, and other higher olefins. A polymer can also be obtained by physically blending homopolymers and/or copolymers.

In general, it is preferred for the polymer to comprise at least about 85 mole percent moieties derived from branched higher alpha-olefins, and more preferably, at least about 90 mole percent moieties derived from branched higher alpha-olefins. Most preferably, the polymer comprises at least about 95 mole percent moieties derived from branched higher alpha-olefins, which results in a polymer of superior strength and a high melting point.

Polymer Stabilizing Package

After the polymer has been produced, it is essential, according to this invention, that the polymer be given a prophylatic charge with a hindered phenol before additional processing of the polymer. The hindered phenol acts as an antioxidant and improves the heat, light, and/or oxidation stability of the polymer. As a result of the prophylactic charge, the polymer product can withstand drying and storage after the polymerization process. Any hindered phenol in an amount which improves the heat, light, and/or oxidation stability of the polymer is applicable. Exemplary hindered phenol compounds include, but are not limited to, 2,6-di-tert-butyl-4-methylphenol; tetrakis(methylene 3-(3,5-di-tert-butyl-4-hydroxyphenyl)propionate) methane; thiodiethylene bis(3-(3,5-di-tert-butyl-4-hydroxyphenyl)propionate); octadecyl 3-(3,5-di-tert-butyl-4-hydroxyphenyl)-propionate; 1,3,5-tris(3,5-di-tert-butyl-4-hydroxybenzyl)isocyanurate; 1,3,5-trimethyl-2,4,6-tris(3,5-di-tert-butyl-4-hydroxybenzyl)benzene; and/or 2,2'-methylene bis(4-methyl-6-tert-butylphenol). Preferably the hindered phenol antioxidant used for the prophylactic charge is selected from the group consisting of 2,6-di-tert-butyl-4-methylphenol; tetrakis(methylene 3-(3,5-di-tert-butyl-4-hydroxyphenyl)propionate)methane; octadecyl 3-(3,5-di-tert-butyl-4-hydroxyphenyl )propionate; and mixtures thereof because of ease of use, availability, and economic reasons.

In addition to the essential prophylactic charge of hindered phenol, other antioxidants or stabilizers can be added to further stabilize the polymer. The type(s) of stabilizer(s) used depends on the final application or use of the polymer. Numerous polymer additives are commercially available and are usually selected from the group consisting of additional hindered phenols, organic phosphites, hindered amine light stabilizers, thioesters, aliphatic thio compounds and mixtures thereof.

The total polymer stabilizer package that can be added prior to grafting, which comprises the essential hindered phenol antioxidant prophylactic charge, and the optional additional hindered phenol, organic phosphite, thioesters and/or hindered amine light stabilizer, is usually added to the polymer in an amount in the range of about 0.05 to about 2 parts by weight of total stabilizer(s) per 100 parts by weight of polymer (phr). Preferably, the hindered phenol prophylactic charge comprises an amount in the range of about 0.1 to about 1 phr, and most preferably in an amount in the range of about 0.1 to about 0.8 phr. If insufficient hindered phenol is present, oxidative degradation of the polymer can occur. The presence of excess hindered phenol can interfere with the grafting process. If desired, additional stabilizers, i.e., in excess of 2 phr, can be added any time after the grafting process, depending upon the desired polymer properties.

Other Polymer Additives

Other additives can optionally be incorporated into the polymer, before and after grafting, to achieve additionally desired beneficial polymer properties. General exemplary additives include, but are not limited to, antioxidants, antioxidant synergists, UV absorbers, nickel stabilizers, pigments, plasticizing agents, optical brighteners, antistatic agents, flame retardants, lubricating agents, metal inhibitors, and the like. Processing lubricants can also be added to enhance polymer properties. Examples of processing lubricants include, but are not limited to, fatty acids containing from about 10 to about 20 carbon atoms and the metal salts thereof. Usually, metal stearates, such as, for example, calcium stearate and zinc stearate, and/or metal laurates are used as processing lubricants and/or acid scavengers for polyolefins. If corrosion is a potential problem, one or more corrosion inhibitors can be added.

Any additive can be combined with the polymer according to any method known in the art. Examples of incorporation methods include, but are not limited to, dry mixing in the form of a powder and wet mixing in the form of a solution or slurry. In these types of methods, the polymer can be in any form, such as, for example, fluff, powder, granulate, pellet, solution, slurry, and/or emulsion. For ease of operation, the initial prophylactic charge of hindered phenol is usually solution or slurry mixed with the polymer prior to drying and handling of the polymer. Any additional stabilizers or additives can be blended with the polymer prior to grafting, added to the polymer melt during the grafting or glass reinforcing process, and/or added during reprocessing of the grafted, glass reinforced polymer.

Grafting Compounds

The stabilized, stereoregular polymers of branched higher alpha-olefins are modified by grafting with a radically polymerizable unsaturated grafting compound selected from the group consisting of vinyl-polymerizable, unsaturated, hydrolyzable silane compounds, carboxylic acids and derivatives, carboxylic acid anhydrides and derivatives, and mixtures thereof, in the presence of a free radical generator.

The vinyl-polymerizable unsaturated, hydrolyzable silanes used in this invention contain at least one silicon-bonded hydrolyzable group, such as, for example, alkoxy, halogen, and acryloxy, and at least one silicon-bonded vinyl-polymerizable unsaturated group such as, for example, vinyl, 3-methacryloxypropyl, alkenyl, 3-acryloxypropyl, 6-acryloxyhexyl, alkynyloxypropyl, ethynyl, and 2-propynyl. The silicon-bonded vinyl-polymerizable unsaturated group preferably is an ethylenically unsaturated group. Any remaining valances of silicon not satisfied by a hydrolyzable group or a vinyl-polymerizable unsaturated group are satisfied by a monovalent hydrocarbon group, such as, for example, methyl, ethyl, propyl, isopropyl, butyl, pentyl, isobutyl, isopentyl, octyl, decyl, cyclohexyl, cyclopentyl, benzyl, phenyl, phenylethyl, and naphthyl. Suitable silanes of this type include those represented by the formula:

$$R_a SiX_b Y_c$$

wherein R is a monovalent hydrocarbon group, X is a silicon-bonded hydrolyzable group, Y is a silicon-bonded monovalent organic group containing at least one vinyl-polymerizable unsaturated bond, a is an integer of 0 to 2, preferably 0; b is an integer of 1 to 3, preferably 3; c is an integer of 1 to 3, preferably 1; and a+b+c is equal to 4.

Suitable vinyl-polymerizable unsaturated hydrolyzable silanes that can be used in this invention include, but are not limited to, 3-acryloxypropyltriethoxysilane, ethynyltriethoxysilane, 2-propynyltrichlorosilane, 3-acryloxypropyldimethylchlorosilane, 3-acryloxypropyldimethylmethoxysilane, 3-acryloxypropylmethyldichlorosilane, 3-acryloxypropyltrichorosilane, 3-acryloxypropyltrimethoxysilane, allyldimethylchlorosilane, allylmethyldichlorosilane, allyltrichlorosilane, allyltriethoxysilane, allyltrimethoxysilane, chloromethyldimethylvinylsilane, [2-(3-cyclohexenyl)ethyl]dimethylchlorosilane, 2-(3-cyclohexenyl)ethyltrimethoxysilane, 3-cyclohexenyltrichlorosilane, diphenylvinylchlorosilane, diphenylvinylethoxysilane, (5-hexenyl)dimethylchlorosilane, (5-hexenyl)diethylchlorosilane, 5-hexenyltrichlorosilane, 3-methacryloxpropyldimethylchlorosilane, 3-methacryloxypropyldimethylethoxysilane, 3-methacryloxypropylmethyldiethoxysilane, 3-methacryloxypropyltrichlorosilane, methyl-2-(3-cyclohexenyl)-ethyldichlorosilane, methyl-3-(trimethylsiloxy)crotonate, 7-octenyltrichlorosilane, 7-octenyltrimethoxysilane, 1-phenyl-1-trimethylsiloxyethylene, phenylvinyldichlorosilane, styrylethyltrimethoxysilane, 1,3-tetradecenyltrichlorosilane, 4-[2-(trichlorosilyl)ethyl]cyclohexene, 2-(trimethylsiloxy)ethylmethacrylate 3-(trimethylsilyl)cyclopentene, vinyldimethylchlorosilane, vinyldimethylethoxysilane, vinylethyldichlorosilane, vinylmethyldiacetoxysilane, vinylmethyldichlorosilane, vinylmethyldiethoxysilane, vinyltrimethylsilane, vinyltrichlorosilane, vinyltriethoxysilane, vinyltrimethoxysilane, vinyltris(beta-methoxyethoxy)silane, vinyltriacetoxysilane, 3-methacryloxypropyltrimethoxysilane, 3-methacryloxypropyltris(beta-methoxyethoxy)silane and mixtures thereof.

The preferred silane compounds are vinyltrichlorosilane, vinyltriethoxysilane, vinyltrimethoxysilane, vinyltris(beta-methoxyethoxy)silane, vinyltriacetoxysilane, 3-methacryloxypropyltrimethoxysilane, 3-methacryloxypropyltris(beta-methoxyethoxy)silane, and mixtures thereof. These compounds are preferred due to commercial availability, ease of use, as well as good polymer property improvement.

The radically polymerizable unsaturated grafting compound also can be a carboxylic acid or an anhydride thereof, with about three to about 10 carbon atoms, with preferably at least one olefinic unsaturation, and derivatives thereof. Examples of the carboxylic acid and anhydride include, but are not limited to, an unsaturated monocarboxylic acid such as acrylic acid or methacrylic acid; an unsaturated dicarboxylic acid such as maleic acid, fumaric acid, iraconic acid, citraconic acid, allyl succinic acid, muconic acid (mesaconic acid), glutaconic acid, norbornene-2,3-dicarboxylic acid (tradename Nadic acid), methyl Nadic acid, tetrahydrophthalic acid, or methylhexahydrophthalic acid; an unsaturated dicarboxylic anhydride such as maleic anhydride, itaconic anhydride, citraconic anhydride, allyl succinic anhydride, glutaconic anhydride, Nadic anhydride (Trademark for norbornene-2,3-dicarboxylic anhydride), methyl Nadic anhydride, tetrahydrophthalic anhydride, or methyltetrahydrophthalic anhydride; or a mixture of two or more thereof. Of these unsaturated carboxylic acids and acid anhydrides thereof, maleic acid, maleic anhydride, muconic acid, Nadic acid, methyl Nadic acid, methyl Nadic anhydride, or Nadic anhydride is preferably used.

The radically polymerizable unsaturated grafting compound is present in the reaction mixture in an amount sufficient to improve the properties of the resultant grafted polymer. Usually, the amount is in the range of about 0.1 to about 2 parts of radically polymerizable unsaturated grafting compound per 100 parts of polymer (phr), preferably in the range of about 0.2 to about 1.6 phr, and most preferably in the range of about 0.4 to about 1.2 phr. If too much grafting compound is used, not all of the grafting compound will be grafted onto the polymer and no additional appreciable polymer property improvement is obtained; an excess is economically undesirable. Use of too little grafting compound does not improve or enhance the polymer properties. In general, the grafting compounds used in this invention have similar amounts of functionality.

The grafting reaction must occur in the presence of a free radical generator, also called a free radical initiator. An organic peroxide is preferably used as the free radical initiator in the graft modification reaction as described above. More specifically, preferred examples of an organic peroxide include, but are not limited to, alkyl peroxides, aryl peroxides, acyl peroxides, aroyl peroxides, ketone peroxides, peroxycarbonates, peroxycarboxylates, hydroperoxides, and other organic peroxides. Examples of an alkyl peroxide include diisopropyl peroxide; di-tert-butyl peroxide; 2,5-dimethyl-2,5-di-(tert-butylperoxy)hexyne-3; a,a'-bis(tert-butylperoxy)-diisopropyl benzene; and 2,5-dimethyl-2,5-di-(tert-butylperoxy)hexane. An example of an aryl peroxide is dicumyl peroxide. An example of an acyl peroxide is dilauroyl peroxide. An example of an aroyl peroxide is dibenzoyl peroxide. Examples of a ketone peroxide include methyl ethyl ketone peroxide and cyclohexanone peroxide. Examples of hydroperoxide include tert-butyl hydroperoxide and cumene hydroperoxide. Preferred examples of a free radical initiator are di-tert-butyl peroxide; 2,5-dimethyl-2,5-di(tert-butylperoxy)-hexyne-3; 2,5-dimethyl-2,5-di(tert-butyl-peroxy)hexane, dicumyl peroxide; a,a'-bis(tert-butylperoxy)diisopropyl-benzene; and mixtures thereof. Higher molecular weight organic peroxide compounds are preferred because they are safer and easier to handle and store, as well as being more stable at higher temperatures.

The organic peroxide is present in the grafting reaction in an amount sufficient to effectuate a grafting reaction. Usually, the amount is in the range of about 0.001 to about 5 parts of organic peroxide per 100 parts per polymer (phr), preferably in the range of about 0.001 to about 1 phr, and most preferably in the range of about 0.005 to about 0.4 phr. Too much organic peroxide can still initiate the grafting reaction, but polymer degradation, such as vis-breaking of the polymer, can occur. A concentration of organic peroxide which is too low does not initiate the grafting reaction.

The grafting reaction must occur in the polymer melt. Thus, the temperature of the reaction is in the range from about the polymer melting point to about the polymer decomposition temperature. Preferably, the reaction temperature is in the range from about 20° C. above the polymer melting point to about the decomposition temperature of the polymer. Most preferably, the lower end of the temperature range is utilized to minimize any thermal degradation effects to the polymer.

The time required for the grafting reaction is a length sufficient for the grafting to occur. Usually, the time is in the range of about 10 seconds to about 30 hours, preferably in the range of from about 15 seconds to about 3 hours. Most preferably, the reaction time is in the range of from about 30 seconds to about 10 minutes. Shorter times, such as less than 5 minutes, are preferred to minimize thermal degradation effects to the polymer.

The grafting reaction can be carried out by either batch or continuous processes, provided that all components are well dispersed and well blended. A continuous process is preferred for ease of operation. One example of a continuous process is to add the polymer(s), stabilizer(s), grafting compound(s), and free radical generator(s) to an extruder. The order of addition of the components is not critical. For example, all components can be dry mixed and then extruded. If preferred, the reactants can be added sequentially wherein, for example, the grafting reaction occurs first, and additional stabilizer(s) is added downstream from the extruder.

Reinforcement Materials

The glass fiber reinforcement improves the properties, such as, for example, the mechanical and thermal properties, of the polymer. Glass reinforcements having a variety of compositions, filament diameters and forms are useful in this invention.

The diameter of the glass fiber is preferably less than 20 micrometers ($\mu$m), but may vary from about 3 to about 30 $\mu$m. Glass fiber diameters are usually given a letter designation between A and Z. The most common diameters used in glass reinforced thermoplastics are G-filament (about 9 $\mu$m) and K-filament (about 13 $\mu$m). Several forms of glass fiber products can be used for reinforcing thermoplastics. These include yarn, woven fabrics, continuous roving, chopped strand, mats, etc. Continuous filament strands are generally cut into lengths of ⅛, 3/16, ¼, 178, ⅜, and 1 inch or longer for compounding efficacy in various processes and products.

Any fiberous silicon oxide material can be used. Examples of types of glass include, but are not limited to, type A glass (an alkali glass), type E glass (a boroaluminosilicate), type C glass (a calcium aluminosilicate), and type S glass (a high-strength glass). Type E glass is presently preferred due to economic reasons and commercial availability.

Commercial glasses sold for use as reinforcement material in thermoplastics are usually sized during either the fiber formation process or in a posttreatment, and thus are sold with sizing materials already incorporated.

The amount of sizing on the glass fiber product typically ranges from about 0.2 to about 1.5 weight percent based on total weight of the glass and the sizing, although loadings up to 10 percent may be added to mat products.

Depending upon what thermoplastic is to be used, the intended applications, and variations in glass processed by different manufacturers even for the same intended end uses, there are differences in the sizing compositions. The compositions are usually proprietary and many are not disclosed by the manufacturers.

The sizing compositions usually contain a lubricant, which provides protection for the glass fiber strand; a film-former or binder which gives the glass strand integrity and workability; and a coupling agent which provides better adhesion between the glass fiber strand and the polymeric materials that are being reinforced with the glass fiber strand. The lubricant, film-former, and coupling agent can be a single compound or a mixture of two or more compounds. Additional agents which may be used in sizing compositions include emulsifiers, wetting agents, nucleating agents, and the like.

The film-former is usually water soluble or water emulsifiable during processing and must be non-sensitive to water after curing. Examples of film-formers include, but are not limited to, polyesters, epoxy resins, polyurethanes, polyacrylates, polyvinyl acetates, polyvinyl alcohols, styrene-butadiene latexes, starches, and the like.

The coupling agent is usually a silane coupling agent that has a hydrolyzable moiety for bonding to the glass and a reactive organic moiety that is compatible with the polymeric material which is to be reinforced with the glass fibers.

The sizing compositions for use in this invention include those which have as an ingredient: (a) one or more epoxy-functional silanes as a coupling agent or, (b) one or more polyfunctional epoxy resins as a film-former or, (c) a mixture of one or more epoxy-functional silanes and one or more polyfunctional epoxy resins. One such glass fiber reinforcement is produced by CertainTeed Corporation of Valley Forge, Pa., and marketed under the trade designation of Chopped Strand 930, K-filament glass fibers. This glass is marketed for use in polybutylene terephthalate, polycarbonate and styrenic resin systems. Another glass fiber reinforcement which is suitable for use in this invention is that manufactured by PPG Industries, Inc., of Pittsburgh, Pa., and marketed under the trade designation Type 1156 Chopped Strand, G-filament glass fibers. PPG Type 1156 glass is marketed for use in thermoset resin systems such as phenolic, epoxy, DAP (diallyl phthalate), and thermoset polyesters. Alternatively, commercially sized glass without one or more of these ingredients can be used for this invention if (a) one or more epoxy-functional silanes or, (b) one or more polyfunctional epoxy resins or, (c) a mixture of one or more epoxy-functional silanes and one or more polyfunctional epoxy resins is blended with the polymer prior to grafting, and/or added to the polymer melt during the grafting, and/or added during reprocessing of the grafted, glass reinforced polymer.

Epoxy-functional silanes and polyfunctional epoxy resins contemplated as useful in this invention are described in greater detail in the next two sections. The epoxy resins may also provide the hydroxy functionality of those embodiments of this invention which call for use of hydroxy- functional compounds.

The glass fiber reinforcement should be present in the range of about 10 to about 200 parts by weight glass fiber per hundred parts by weight of polymer (phr). Preferably, the glass fibers are present in the range of about 10 to about 120 phr, and most preferably in the range of about 10 to about 80 phr. Expressed in other terms, the glass fibers should be present in about 10 to about 67 weight percent, based on the weight of the total product. Preferably, the glass fibers are present in the range of about 10 to about 55 weight percent, and more preferably in the range of about 10 to about 45 weight percent. Using too small an amount of glass fiber does not improve the polymer properties. Having too much glass fiber results in not enough polymer to coat the glass fibers; i.e. , the fibers are not "wetted out."

The glass fibers can be added any time during processing after the polymer has been initially stabilized with the hindered phenol prophylactic charge. Batch or continuous processes can be used, as long as all components are well dispersed and well blended. A continuous process is presently preferred for ease of operation. One example of a continuous process is to add the polymer, stabilizer(s), grafting compound(s), free radical generator(s), commercially available glass fibers, and optionally, polyfunctional epoxy resin(s) and/or epoxy-functional silane(s) and/or hydroxy-functional resins to an extruder. As with the ;grafting reaction process, the components can be added in any order. For example, all components can be dry mixed and then extruded. If preferred, the reactants can be added sequentially; for example, the grafting reaction occurs first within the presence of the polyfunctional epoxy resin(s) and/or epoxy-functional silane(s) and/or hydroxy-functional resins, and additional stabilizer(s) and then glass fibers are added downstream in the extruder after the grafting reaction has taken place. This latter example is the presently preferred process.

Epoxy-functional Silanes

The epoxysilanes contemplated as useful in making the compositions of this invention include epoxysilanes within the formula:

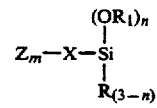

wherein

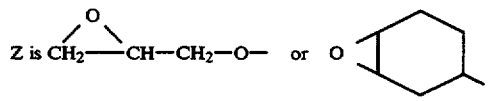

X is a linear or branched alkylene, arylene or arylalkylene hydrocarbon radical having from 1 to about 15 carbon atoms;

$R_1$ is a hydrocarbon radical having from 1 to about 8 carbon atoms;

R is (a) a hydrocarbon radical having from 1 to about 8 carbon atoms, or (b) a chlorine atom;

m is an integer of at least 1; and n is an integer of 1 to 3.

The two different R groups will not necessarily be the same. Presently preferred are epoxysilanes within the formula above wherein n is equal to 3.

Examples of particularly suitable epoxy-functional silanes are 3-glycidoxypropyltrimethoxysilane, 3-glycidoxypropyldimethylethoxysilane; [2-(3,4-epoxy-4-methylcyclohexyl)propyl]methyldiethoxysilane beta-(3,4-epoxycyclohexyl)ethyltrimethoxysilane, 3-glycidoxypropylmethyldiethoxysilane, 2-glycidoxypropyltrimethoxysilane and mixtures of the foregoing epoxy-functional silanes. The presently most preferred epoxy-functional silanes are 3-glycidoxypropyltrimethoxysilane which is commercially available from the Union Carbide Corporation under the trade designation A-187, and beta-(3,4-epoxycyclohexyl)ethyltrimethoxysilane, which is available from the Union Carbide Corporation under the trade designation A-186.

A technical/modified grade of 3-glycidoxypropyltrimethoxysilane is commercially available from Union Carbide Corporation under the trade designation Ucarsil ™ TC-100 organosilicon chemical.

One or more of the epoxy-functional silanes is present in an amount sufficient to effectuate a desired change in the properties of articles made from the glass reinforced polymer. When the epoxy-functional silanes are added to the polymer, this amount is generally in the range of about 0.05 to about 5 parts by weight epoxy-functional silane per hundred parts polymer (phr), more preferably, in an amount in the range of about 0.2 to about 1.6 phr and, most preferably, in an amount of about 0.4 to about 1.2 phr. When the epoxy-functional silanes are components of the sizing on the glass, this amount is generally in the range of about 0.05 to about 0.5 weight percent based on total weight of the glass and sizing on the glass.

If too much epoxy-functional silane is used, no appreciable polymer property improvement is obtained; an excess is economically undesirable. Use of too little epoxy-functional silane does not improve or enhance the polymer properties.

Epoxy Resins

The term epoxy resin refers to materials which contain an epoxy or oxirane group. Polyfunctional epoxy resins contemplated as useful in this invention are compounds having two or more epoxy groups in the molecule. The most common commercial epoxy resins are based on combining hisphenol A and excess epichlorohydrin to form liquid polymers with epoxy end-groups. Liquid epoxy resins can be further reacted with bisphenol A by chain extension to form solid resins of higher molecular weight. Other intermediate-molecular-weight epoxy resins can be prepared by chain extension of liquid epoxy resins and brominated bisphenol A. Epoxy resins are also based on aliphatic backbone structures, such as, for example polyglycidyl ethers of 1,4-butanediol, neopentyl glycol, trimethylolpropane, or higher functionality polyols. Other prominent types of epoxy resins include the multifunctional epoxy phenol and cresol novalacs, which are based on phenol or cresol and formaldehyde and subsequent epoxidation with epichlorohydrin. Examples of polyfunctional epoxy resins include, but are not limited to, hisphenol A epoxy compounds, hisphenol F epoxy compounds, aliphatic ether epoxy compounds, novalac epoxides, isocyanurate epoxides, and mixtures thereof. Specific examples of these include condensates between hisphenol A and epichlorohydrin; polyglycidol ethers of polyols such as ethylene glycol, propylene glycol, polyethylene glycol, glycerol, neopentyl glycol, trimethylol propane, and sorbitol; triglycidyl isocyanurate, N-methyl-N',N"-diglycidyl isocyanurate, and triglycidyl cyanurate. The presently preferred molecular weight of these polyfunctional epoxides is about 4,000 or or less, though the molecular weight could be higher.

The presently most preferred polyfunctional epoxy resin is a high softening point (solid) condensation product of bisphenol A and epichlorohydrin.

One or more of the epoxy resins is present in an amount sufficient to effectuate a desired change in the properties of articles made from the glass reinforced polymers. When the epoxy resin is added to the polymer, this amount is generally in the range of about 0.05 to about 5 parts by weight epoxy resin per hundred parts polymer (phr), more preferably, in an amount in the range of about 0.1 to about 5 phr and, most preferably, in an amount of about 0.1 to about 2.5 phr. When the epoxy resin is a component of the sizing on the glass, this amount is generally in the range of about 0.15 to about 2 weight percent based on total weight of the glass and the sizing.

If too much epoxy resin is used, no appreciable polymer property improvement is obtained; an excess is economically undesirable. Use of too little epoxy resin does not improve or enhance the polymer properties.

Hydroxy-Functional Compounds

Polymeric or oligomeric hydroxy-functional compounds can be used in the compositions of this invention to further improve properties of articles made from the compositions. Addition of appropriate amounts hydroxy-functional compounds to the mixture of stabilized grafted branched higher alpha-olefin polymer, reinforcing materials and other additives during compounding will result in improved tensile strength, flexural strength, flexural modulus, and Izod impact strength.

The hydroxy-functional compounds useful in this invention can be either condensation or addition polymers or oligomers. A degree of polymerization of at least 2 is generally necessary and the degree of polymerization can be as large as about 100,000. A preferred range of the degree of polymerization is from about 5 to about 5000.

A useful category of condensation products includes the reaction products of polyhydridic phenols and epihalohydrins. Presently preferred in this category are bisphenols and epihalohydrins with epoxide equivalent weights greater than about 2,000. An example is bisphenol A and epichlorohydrin where the bisphenol A is combined with an excess of epichlorohydrin to form liquid or solid polymers with epoxy end-groups and pendant hydroxyl groups as previously described. Liquid resins and low equivalent weight solid resin solutions are generally cured through the terminal epoxy groups. Intermediate equivalent weight solid epoxy resins are generally cured through both the terminal epoxy groups and the pendant hydroxyl groups in the polymer backbone. High equivalent weight resins, which can be classified as poly(hydroxy ethers), contain low concentrations of epoxy end-groups and are cured through the pendant hydroxyl groups. Thus the hydroxy-functionality can be supplied by the same polyfunctional resins which supply the epoxy-functionality in the embodiments of this invention which require an epoxy resin.

High equivalent weight condensation products of bisphenol A and epichlorohydrin are commercially available, for example, from Shell Chemical Company as Epon ™ 1009F (2,300–3,800 epoxide equivalent weight) or from Ciba-Geigy Corporation as Araldite ™ GT7099 (2,500–3,575 epoxide equivalent weight).

Other condensation reactions can be used to form hydroxy functional compounds which can be used in this invention. These include esterification of polyhydroxyl alcohols $[R_1-(OH)_n, n>2]$, polycarboxylic acids $[R_2-(COOH)_m, m \geq 2]$ and hydroxy-functional acids $[(OH)_n-R_3-(COOH)_m, n \geq 2, M \geq 2]$, wherein $R_1$, $R_2$ and $R_3$ are hydrocarbyl groups. Examples of polyhydroxyl alcohols include trimethylolpropane, glycerin, pentaerythritol and the like. Examples of polycarboxylic acids include maleic acid, fumaric acid, succinic acid, terephthalic acid and the like. Examples of hydroxy-functional acids include dihydroxybenzoic acid, dihydroxy fumaric acid and the like.

Hydroxy-functional addition products contemplated as useful in this invention can be formed from hydroxy-functional vinyl unsaturated monomers either with or without an unsaturated comonomer. Examples of hydroxy functional unsaturated monomers include "vinyl alcohol" [hydrolyzed or partially hydrolyzed vinyl acetate polymers or oligomers], allyl alcohol, 2-hydroxyethyl acrylate, 2-hydroxyethyl methacrylate, 4-hydroxybutyl acrylate, 4-hydroxybutyl methacrylate, hydroxypropyl acrylate, hydroxypropyl methacrylate, glycerol monoacrylate, glycerol monomethacrylate, glycerol monoallyl ether, 4-vinyl phenol, trimethylolpropane monoallyl ether, pentaerythritol monoacrylate, pentaerythritol monomethacrylate, etc. Examples of appropriate vinyl unsaturated comonomers include ethylene, propylene, styrene, 4-methyl-1-pentene, acrylic acid, acrylic acid esters, acrylic acid amides, methacrylic acid, methacrylic acid esters, methacrylic acid amides, and $C_4$ through $C_{24}$ or higher αolefins. Other unsaturated comonomers such as norbornene, cyclopentadiene, butadiene, isobutylene, etc., can be used.

One or more of the hydroxy-functional compounds, when used, is present in an amount sufficient to effectuate a desired change in the properties of articles made from the glass reinforced polymers. When the hydroxy-functional compound is added to the branched higher alpha-olefin polymer, this amount is generally in the range of about 0.05 to about 5 parts by weight hydroxy-functional compound per hundred parts polymer (phr), more preferably, in an amount in the range of about 0.1 to about 5 phr and, most preferably, in an amount of about 0.1 to about 2.5 phr. Use of too much of the hydroxy-functional compound will result in no appreciable polymer property improvement being obtained; an excess is economically undesirable. Use of too little hydroxy-functional compound does not improve or enhance the polymer properties.

EXAMPLES

The polymethylpentene (PMP) used in the following examples was a homopolymer prepared from 4-methyl-1-pentene (4MP1) by conventional polymerization processes, such as, for example, according to the processes disclosed in U.S. Pat. No. 4,342,854, which is hereby incorporated herein by reference.

The undried polymer was stabilized immediately after polymerization by mixing the polymer with about 0.1% based on total resin, of a solution of a hindered phenolic prophylactic stabilizer, octadecyl 3-(3,5-di-tert-tert-butyl-4-hydroxyphenyl)propionate. See U.S. Pat. No. 4,888,394, which is hereby incorporated herein by reference. These combined solutions were then dried to remove the liquids and produce a treated, stabilized polymer. The polymer had a nominal melt index of about 26 grams/10 minutes. The melt index was measured according to ASTM Method D1238 using a 5 kilogram weight at 260° C.

In each of the following Examples I through VI, 100 parts of treated, stabilized polymer were mixed with 0.04 phr zinc stearate, 0.25 phr tetrakis(methylene 3-(3,5-di-tert-butyl-4-hydroxyphenyl)propionate)methane (available commercially from Ciba-Geigy Corporation as Irganox® 1010), 0.50 phr 3-methacryloxypropyl-trimethoxysilane (available from Union Carbide Corporation as A-174 organofunctional silane), and 0.10 phr 2,5-dimethyl-2,5-(di-tert-butylperoxy)hexane (available from Catalyst Resources, Inc., as Aztec 2,5-Di). The components were dry mixed for about 60 minutes at about 25° C. (room temperature) by drum tumbling.

In each of the following Examples VII through XI, the same procedure for preparing, stabilizing and grafting the polymer was used, with the exception that 0.80 phr of maleic anhydride was used in place of the 3-methacryloxypropyltrimethoxysilane.

In the following example XII, a similar procedure for preparing, stabilizing and grafting the polymer was used, with the exception that 0.50 phr of muconic acid was used in place of the 3-methacryloxypropyltrimethoxysilane.

Example I

Compound 1 is a silane grafted control example for comparison purposes. The drum tumbled polymer mixture described above was mixed by hand with 43.24 parts glass fiber reinforcement in a plastic bag (bag mixed) to produce a mixture with 30 weight percent glass fiber reinforcement. The glass reinforcement product used was a commercially available product sized for compatibility with polypropylene produced by Owens-Corning Fiberglas Corporation and designated 457BA. This product was also recommended by the manufacturer as appropriate for use in reinforcing stereoregular polymers of branched, higher alpha-olefins such as PMP. This glass is a K-filament diameter glass fiber with a 3/16-inch fiber length. It is believed that the film-former in the sizing composition for 457 BA glass fibers is a carboxylic styrene-butadiene latex and that the coupling agent is an amino-functional silane (3-aminopropyltriethoxysilane), although the exact composition of the sizing is not disclosed by the manufacturer. It is also believed that 457 BA glass fibers contain terephthalic acid as a nucleating agent. The amount of sizing on the product is about 0.9 weight percent of the total product weight. The mixture was compounded on a Werner & Pfleiderer ZSK-30 twin screw extruder with a general purpose compounding barrel/screw configuration. The screw speed was 250 rpm and the temperature profile was 260°-290° C.. Throughput was 20 pounds per hour. The compound was stranded, pelletized and dried overnight at 110° C. The resulting compound was injection molded into ASTM test specimens using a Model EC88 Engel injection molding machine with a 55-ton clamp force. The mold temperature was set at 93° C. and the barrel temperature at 270° to 280° C., ascending from the beginning to the end of the barrel. Cycle time was approximately 30 seconds. Measured properties of test specimens molded from the resin of Compound 1 are listed in Table III. The following test procedures were utilized to test all of the Compounds given in these examples.

TABLE II

| Test Procedures Used | |
|---|---|
| Analysis | ASTM Method No. |
| Tensile Strength at Break (psi) | D638, at 5 mm/min |
| Elongation at Break (%) | D638, at 5 mm/min |
| Flexural Strength (psi) | D790, 2 inch span, 1 mm/min |
| Flexural Modulus (ksi) | D790, 2 inch span, 1 mm/min |
| Izod Impact Strength, Notched and Unnotched (ft-lb/in) | D256 |
| Heat Deflection Temperature (°C.) | D648, at 264 psi load |

Example II

In this inventive example, the glass fiber reinforcement material used was not one generally recommended for use with polyolefins but was, instead, one recommended for use with polybutylene terephthalate (a thermoplastic polyester), polycarbonate and styrenic resin systems.

The glass fiber reinforcement material used in this example was a commercial product from CertainTeed Corporation designated Chopped Strand 930. This is a K-filament diameter glass fiber with a ⅛-inch fiber length. It is believed that the sizing composition contains both a polyfunctional epoxy resin film-former and an epoxy-functional silane. It is further believed that the polyfunctional epoxy resin is a condensation product of hisphenol A and epichlorohydrin and that the epoxy-functional silane is 3-glycidoxypropyltrimethoxysilane, although the exact composition of the sizing is not disclosed by the manufacturer. The amount of sizing on the product is about 0.80 weight percent based on total weight of the sized glass.

The process described above for Example I was repeated with the exception that the glass fiber reinforcement material used was the Chopped Strand 930 glass fiber reinforcement material described above. The properties of test specimens molded from the resulting compound (Compound 2) are listed in Table III.

It is clear from the data that glass fiber reinforcement with a sizing composition which includes both a polyfunctional epoxy resin and an epoxy-functional silane provides significantly better mechanical properties in test specimens molded from compounds of silane grafted, glass reinforced, stereoregular polymers of branched, higher alpha-olefins than glass reinforcements sized for compatibility with polyolefins such as those described in Example I above.

Example III

In this inventive example, the glass fiber reinforcement product used was not one generally recommended for use with polyolefins but was, instead, one recommended for use in phenolic, epoxy, DAP (diallyl phthalate), and thermoset polyester resin systems. The specific product is a commercial product from PPG Industries, Inc., designated Type 1156 Chopped Strand. It is a G-filament diameter glass fiber with a ⅛-inch fiber length. Although the exact sizing composition is not disclosed by the manufacturer, it is believed that Type 1156 Chopped Strand contains both a polyfunctional epoxy resin film-former and an epoxy-functional silane. The amount of sizing on the product is about 1.15 weight percent based on total weight of the sized glass.

The process described above for Example I was repeated with the exception that the glass fiber reinforcement product was Type 1156 Chopped Strand. The properties of test specimens molded from the resulting compound (Compound 3) are listed in Table III.

It is again clear from the data that glass fiber reinforcement with a sizing composition which includes both a polyfunctional epoxy resin and an epoxy-functional silane provides significantly better mechanical properties in test specimens molded from compounds of silane grafted, glass reinforced, stereoregular polymers of branched, higher alpha-olefins than glass reinforcements sized for compatibility with polyolefins such as those described in Example I above. The additional improvement; in properties of test specimens molded from Compound 3 compared to those molded from Compound 2 is due to the smaller filament diameter of the glass fiber reinforcement.

Example IV

In this inventive example, an epoxy-functional silane, 3-glycidoxypropyltrimethoxysilane (Ucarsil TM TC-100 available from Union Carbide Corporation) was used in conjunction with glass fiber of the type used in Example I, one sized for compatibility with polypropylene. The procedure was that of Example I, with the epoxy-functional silane included with the group of ingredients which were bag mixed.

| | |
|---|---|
| PMP, vinyl-polymerizable silane and additives | 100.89 parts |
| epoxy-functional silane | 0.50 parts |
| OCF 457 BA glass fiber | 43.45 parts |

The PMP with additives was a drum tumbled mixture as described in the introduction to these examples. Properties of the resulting compound (Compound 4) are listed in Table III.

The mechanical properties of test specimens molded from Compound 4 relative to the properties of those molded from Compound 1 which did not have an epoxy-functional silane are significantly better.

Example V

In this inventive example, a polyfunctional epoxy resin typical of "epoxy film formers" used in some glass fiber reinforcement sizing compositions was used in conjunction with the glass fiber reinforcement sized for compatibility with polypropylene which was used in Example I. The specific epoxy compound used was a bisphenol A extended bisphenol A/epichlorohydrin condensation product available from Shell Chemical Company as Epon TM 1009F. The epoxide equivalent weight is approximately 2,300–3,800. The procedure was that of Example I, with the polyfunctional epoxy resin included with the group of ingredients which were bag mixed. The following ingredients were bag mixed:

| | |
|---|---|
| PMP, vinyl-polymerizable silane and additives | 100.89 parts |
| epoxy-resin (Epon TM 1009) | 1.00 parts |
| OCF 457 BA glass fiber | 43.67 parts |

The PMP with additives was a drum tumbled mixture as described in the introduction to these examples. Properties of test specimens molded from the resulting compound (Compound 5) are given in Table III.

The mechanical properties of test specimens molded from Compound 5 relative to the properties of those molded from Compound I which did not have a polyfunctional epoxy resin are significantly better.

Example VI

In this inventive example both the epoxy-functional silane used in Example IV and the epoxy resin used in Example V were used in conjunction with the glass fiber reinforcement sized for compatibility with polypropylene used in Example I. Essentially, the procedures of Examples IV and V were repeated except that the ingredients and their relative weight levels were as follows:

| PMP, vinyl-polymerizable silane and additives | 100.89 parts |
| --- | --- |
| epoxy-functional silane | 0.50 parts |
| epoxy resin | 1.00 parts |
| OCF 457 BA glass fiber | 43.88 parts |

The PMP with additives was a drum tumbled mixture as described in the introduction to these examples. The properties of the resulting compound (Compound 6) are listed in Table III.

The increase in properties of Compound 6 relative to those of Compound 1 is again apparent.

This example, as well as the inventive Examples II, III, IV and V described above, indicates that sizing compositions for treating glass fibers which contain (a) one or more polyfunctional epoxy resins as a film-former, (b) one or more epoxy-functional silanes as a coupling agent or, (c) a mixture of one or more polyfunctional epoxy resins and one or more epoxy-functional silanes, provide improved adhesion between the glass fiber strand and silane grafted stereoregular polymers of branched, higher alpha-olefins.

This example, as well as the proceeding examples described above, also indicates that as an alternative commercially sized glass fiber products without one or more of these ingredients can be used to provide improved adhesion between the glass fiber strand and silane grafted stereoregular polymers of branched higher alpha-olefins if (a) one or more polyfunctional epoxy resins or, (b) one or more epoxy-functional silanes or, (c) a mixture of one or more polyfunctional epoxy resins and one or more epoxy-functional silanes is blended with the PMP and additives for silane grafting described in this invention.

percent, based on weight of the polymer and additives, of glass fiber reinforcement. The glass reinforcement product used was a commercially available product sized for compatibility with polypropylene produced by Owens-Corning Fiberglas Corporation and designated 457 BA. This glass product was described in Example I above. The mixture was compounded, stranded, pelletized and dried as described in Example I. The resulting compound was injection molded into ASTM test specimens and tested as described in Example I. Measured properties of test specimens molded from the resin of Compound 7 are listed in Table IV. The test procedures shown in Table II above were utilized to test all of the Compounds given in these examples.

Example VIII

In this inventive example, the glass fiber reinforcement material used was not one generally recommended for use with polyolefins but is, instead, one recommended for use with polybutylene terephthalate (a thermoplastic polyester), polycarbonate and styrenic resin systems.

The glass fiber reinforcement material used in this example was a commercial product from CertainTeed Corporation designated Chopped Strand 930. This glass fiber reinforcement material was described in Example II above.

The process described above for Example VII was repeated with the exception that the glass fiber reinforcement material used was the Chopped Strand 930 glass fiber reinforcement material described in Example II. The properties of test specimens molded from the resulting compound (Compound 8) are listed in Table IV.

TABLE III

Properties of Glass Reinforced Silane Grafted Branched Higher Alpha-Olefin Polymers with Epoxy-Functional Silanes and/or Epoxy Resins

| Properties | Compound 1 (Control) | Compound 2 | Compound 3 | Compound 4 | Compound 5 | Compound 6 |
| --- | --- | --- | --- | --- | --- | --- |
| Tensile Strength, psi | 8,900 | 11,200 | 11,700 | 10,100 | 9,800 | 10,300 |
| Flexural Strength, psi | 12,700 | 15,400 | 16,100 | 13,700 | 13,400 | 13,700 |
| Flexural Modulus, ksi | 765 | 855 | 812 | 788 | 780 | 780 |
| Elongation, % | 3.5 | 4.7 | 5.0 | 3.8 | 3.9 | 3.9 |
| Notched Izod Impact Strength, ft-lb/in | 1.1 | 1.4 | 1.2 | 1.2 | 1.1 | 1.1 |
| Unnotched Izod Impact Strength, ft-lb/in | 3.5 | 6.5 | 5.9 | 4.2 | 4.4 | 4.5 |
| Heat Distortion Temperature at 264 psi, °C. | 187 | 188 | 196 | 183 | 185 | 186 |

Example VII

Compound 7 is a control example for comparison purposes. The following components were dry mixed for about 60 minutes at 25° C. (room temperature) by drum tumbling.

| PMP homopolymer | 100 parts |
| --- | --- |
| zinc stearate | 0.04 parts |
| Irganox 1010 | 0.25 parts |
| maleic anhydride | 0.80 parts |
| Aztec 2,5-Di | 0.10 parts |

This drum tumbled mixture was then mixed by hand with 43.37 parts glass fiber reinforcement in a plastic bag (bag mixed) to produce a mixture with 30 weight It is clear from the data that glass fiber reinforcement with a sizing composition which includes both a polyfunctional epoxy resin and an epoxy-functional silane provides significantly better mechanical properties in test specimens molded from compounds of maleic anhydride grafted, glass reinforced, stereoregular polymers of branched, higher alpha-olefins than does use of glass reinforcements sized for compatibility with polyolefins such as those used in Example VII above.

Example IX

In this inventive example, an epoxy-functional silane, 3-glycidoxypropyltrimethoxysilane (Ucarsil TM TC-100 available from Union Carbide Corporation) was used in conjunction with glass fiber of the type used in Example VII, one sized for compatibility with polypropylene. The procedure was that of Example VII, with the epoxy-functional silane included with the group of ingredients which were bag mixed:

| PMP, carboxylic anhydride and additives | 101.19 parts |
|---|---|
| epoxy-functional silane | 0.50 parts |
| OCF 457 BA glass fiber | 43.45 parts |

The PMP with additives was a drum tumbled mixture as described in the introduction to these examples. Properties of the resulting compound (Compound 9) are listed in Table IV.

The increase in mechanical properties of test specimens molded from Compound 9 relative to the properties in compounds of maleic anhydride grafted, glass reinforced, stereoregular polymers of branched, higher alpha-olefins such as that of Compound 7 which did not have an epoxy-functional silane is readily apparent.

Example X

In this inventive example, a polyfunctional epoxy resin typical of "epoxy film formers" used in some glass fiber reinforcement sizing compositions was used in conjunction with the glass fiber reinforcement sized for compatibility with polypropylene which was used in Example VII. The specific epoxy compound used was a hisphenol A extended bisphenol A/epichlorohydrin condensation product available from Shell Chemical Company as Epon ™ 1009F. The epoxide equivalent weight is approximately 2,300–3,800. The procedure was that of Example VII, with the polyfunctional epoxy resin included with the group of ingredients which were bag mixed. The ingredients which were bag mixed were as follows:

| PMP, carboxylic anhydride and additives | 101.19 parts |
|---|---|
| epoxy resin | 1.00 parts |
| OCF 457 BA glass fiber | 43.67 parts |

The PMP with additives was a drum tumbled mixture as described in the introduction to these examples.

Properties of test specimens molded from the resulting compound (Compound 10) are given in Table IV.

Example XI

In this inventive example both the epoxy-functional silane used in Example IX and the epoxy resin used in Example X were used in conjunction with the glass fiber reinforcement sized for compatibility with polypropylene used in Example VII. Essentially, the procedures of Examples IX and X were repeated except that the ingredients were as follows:

| PMP, carboxylic anhydride and additives | 101.19 parts |
|---|---|
| epoxy-functional silane | 0.50 parts |
| epoxy resin | 1.00 parts |
| OCF 457 BA glass fiber | 43.88 parts |

The PMP with additives was a drum tumbled mixture as described in the introduction to these examples.

The properties of test specimens molded from the resulting compound (Compound 11) are listed in Table IV.

The increase in properties of test specimens molded from Compound 11 relative to those of Compound 7 is again apparent.

This example, as well as the inventive Examples VIII, IX and X described above, indicates that sizing compositions for treating glass fibers which contain (a) one or more polyfunctional epoxy resins as a film-former, (b) one or more epoxy-functional silanes as a coupling agent or, (c) a mixture of one or more polyfunctional epoxy resins and one or more epoxy-functional silanes, provide improved adhesion between the glass fiber strand and maleic anhydride grafted stereoregular polymers of branched, higher alpha-olefins.

This example, as well as the preceding examples described above, also indicates that as an alternative commercially sized glass fiber products without one or more of these ingredients can be used to provide improved adhesion between the glass fiber strand and maleic anhydride grafted stereoregular polymers of branched higher alpha-olefins if (a) one or more polyfunctional epoxy resins or, (b) one or more epoxy-functional silanes or, (c) a mixture of one or more polyfunctional epoxy resins and one or more epoxy-functional silanes is blended with the PMP and additives for maleic anhydride grafting described in this invention.

TABLE IV

Properties of Glass Reinforced Carboxylic Anhydride Grafted Branched Higher Alpha-Olefin Polymers with Epoxy-Functional Silanes and/or Epoxy Resins

| Properties | Compound 7 (Control) | Compound 8 | Compound 9 | Compound 10 | Compound 11 |
|---|---|---|---|---|---|
| Tensile Strength, psi | 7,800 | 11,300 | 10,700 | 9,800 | 10,500 |
| Flexural Strength, psi | 10,700 | 16,300 | 15,700 | 14,100 | 15,300 |
| Flexural Modulus, ksi | 741 | 779 | 784 | 746 | 792 |
| Elongation, % | 2.7 | 5.0 | 4.8 | 4.2 | 4.3 |
| Notched Izod Impact Strength, ft-lb/in | 0.8 | 1.9 | 1.6 | 1.2 | 1.5 |
| Unnotched Izod Impact Strength, ft-lb/in | 3.2 | 10.3 | 9.5 | 6.0 | 7.2 |
| Heat Distortion Temperature at 264 psi, °C. | 162 | 195 | 194 | 189 | 189 |

The increase in mechanical properties of test specimens molded from Compound 10 relative to the properties of test specimens molded from Compound which did not have a polyfunctional epoxy resin is readily apparent.

Example XII

In this inventive example, the glass fiber reinforcement material used was not one generally recommended for use with polyolefins but is, instead, one recommended for use with polybutylene terephthalate thermoplastic polyester), polycarbonate and styrenic resin systems.

The glass fiber reinforcement material used in this example was a commercial product from CertainTeed Corporation designated Chopped Strand 930. This glass fiber reinforcement material was described in Example II above.

The process similar to that described above for Example VII was repeated with the exceptions that: (a) the glass fiber reinforcement material used was the Chopped Strand 930 glass fiber reinforcement material described in Example II; and (b) the PMP was modified with muconic acid instead of 3-methacryloxypropyl-trimethoxysilane. The PMP, after being stabilized with a hindered phenol as described in the introduction to these examples, was mixed with 0.04 phr zinc stearate, 0.10 phr tetrakis(methylene 3-(3,5-di-tert-butyl-4-hydroxyphenyl)propionate)methane (available commercially from Ciba-Geigy Corporation as Irganox 1010), 0.50 phr muconic acid in the form of cis,cis 2,4-hexadienedioic acid (available commercially from Celgene Corporation) and 0.05 phr a,a'-bis(tert-butylperoxy)diisopropyl benzene (available from Hercules, Inc., as Vulcup R). The components were dry mixed for about 60 minutes at about 25° C. (room temperature) by drum tumbling.

The drum tumbled polymer mixture described above was grafted using the processing conditions as described in Example I and subsequently mixed with 43.24 parts glass fiber reinforcement in the extruder to produce a mixture with 30 weight percent glass fiber reinforcement.

Articles made from the compound produced in this Example XII (Compound 12) were tested using the same test methods as were used in all the foregoing examples. The resulting properties shown in the following Table V indicated that articles made from PMP which had been grafted with muconic acid and reinforced with glass having sizing containing materials with epoxy functionality also demonstrated improved properties when compared with articles made from PMP which had been grafted with unsaturated hydrolyzable silane or carboxylic anhydride and reinforced with the same glass reinforcement.

TABLE V

Properties of Glass Reinforced Muconic Acid Grafted Branched Higher Alpha-Olefin Polymers with Epoxy-Functional Silanes and/or Epoxy Resins

| Properties | Compound 2[a] | Compound 8[a] | Compound 12[b] |
|---|---|---|---|
| Tensile Strength, psi | 11,200 | 11,300 | 10,700 |
| Elongation, % | 4.7 | 5.0 | 5.1 |
| Notched Izod Impact Strength, ft-lb/in | 1.4 | 1.9 | 1.2 |
| Unnotched Izod Impact Strength, ft-lb/in | 6.5 | 10.3 | 6.1 |
| Heat Distortion Temperature at 264° psi, °C. | 188 | 195 | 199 |

[a]Runs 2 and 8 are repeated here for purposes of easier comparison. Compound 2 was made using PMP grafted with an unsaturated hydrolyzable silane. Compound 8 was made using PMP grafted with a carboxylic acid.
[b]Compound 12 was made using PMP grafted with muconic acid.

Example XIII

This example demonstrates the efficacy of using resins with hydroxy functionality in glass reinforced silane grafted polymethylpentene molding compounds. This is particularly useful when using glass reinforcing materials which have sizing containing: (a) one or more polyfunctional epoxy resins as a film-former, (b) one or more epoxy-functional silanes as a coupling agent or, (c) a mixture of one or more polyfunctional epoxy resins and one or more epoxy functional silanes.

The polymethylpentene (PMP) used in Examples XIII, XIV and XV was a homopolymer fluff prepared and stabilized as described in the introduction to these examples. PMP with a melt flow of 12.7 g/10 min was used in this Example XIII.

In this inventive example, a high epoxide equivalent weight epoxy resins was used in conjunction with glass fiber of the type used in Example III, one sized for compatibility with phenolic, epoxy, DAP (diallyl phthalate), and thermoset polyester resin systems. The specific hydroxy-functional compound used in this example was a bisphenol A extended bisphenol A/epichlorohydrin condensation product available from Shell Chemical Company as Epon TM 1009F. The epoxide equivalent weight of this epoxy resin was approximately 2,300–3,800. This epoxy resin has a high concentration of pendant hydroxy groups relative to the concentration of the epoxy end-groups. The hydroxy/epoxy ratio of Epon TM 1009F resin is approximately 9:1. According to the product literature the hydroxy content of this resin is approximately 0.32–0.34 equivalents per 100 grams.

The procedure was that of Example I, with the hydroxy-functional compound included with the group of ingredients which were bag mixed. The hydroxy-functional resin was ground in a Thomas mill to facilitate blending.

The following ingredients were mixed by hand in plastic bags to produce mixtures with 30% by weight glass reinforcement:

| | |
|---|---|
| PMP, vinyl-polymerizable silane and additives | 100.89 parts |
| Epon TM 1009F epoxy resin | 1.00 parts |
| PPG Type 1156 glass fiber | 43.67 parts |

The PMP with additives was a drum tumbled mixture as described in the introduction to these examples.

The mixture was compounded (designated compound EL3) and molded into test specimens as described in previous examples. The properties of the test specimens were determined using ASTM methods indicated in Table II above. Properties of test specimens molded from the resultant compound (Compound 13) are given in Table VI.

The mechanical properties of test specimens molded from Compound 13 were compared to the properties of those molded from inventive Compound 3 which did not have a hydroxy-functional additive and which was reinforced with the same type of glass fiber having the same sizing materials. This comparison of properties showing improvement attributable to use of the hydroxy-functional additive is presented in Table VI.

TABLE VI

Effect of Hydroxy-Functional Additives on Properties of Test Specimens of Silane Grafted, 30% Glass Reinforced Polymethylpentene Compounds

|  | Compound 3[a] | Compound 13[b] | Compound 14[c] | Compound 15[d] |
|---|---|---|---|---|
| Hydroxy-functional Additive | None | Epon TM 1009F epoxy resin | poly(styrene-allyl alcohol) | poly(ethylene-vinyl alcohol) copolymer |
| Tensile Strength, psi | 11,700 | 12,500 | 12,200 | 12,900 |
| Flexural Strength, psi | 16,100 | 17,200 | 17,200 | 18,600 |
| Flexural Modulus, ksi | 812 | 787 | 839 | 814 |
| Notched Izod Impact Strength, ft-lb/in | 1.2 | 1.6 | 1.4 | 2.1 |
| Unnotched Izod Impact Strength, ft-lb/in | 5.9 | 8.6 | 7.1 | 10.7 |
| Heat Distortion Temperature at 264 psi, °C. | 196 | 192 | 192 | 196 |

[a] Inventive Compound 3 of Example III is repeated here for purposes of easier comparison.
[b] Prepared according to Example XIII.
[c] Prepared according to Example XIV.
[d] Prepared according to Example XV.

Example XIV

This example demonstrates use of an addition product of styrene and allyl alcohol to provide hydroxy functionality and the effect of this additive on properties of articles made from silane grafted, glass reinforced branched higher alpha-olefin polymers. The polymethylpentene used in this example was prepared, stabilized, grafted, and compounded with glass and additives as described in Example XIII. The PMP had a melt flow of 12.7 g/10 min. The glass fiber used in this example was the same as that used in Example III, i.e., one sized for use in phenolic, epoxy, DAP (diallyl phthalate), and thermoset polyester resin systems. The poly(styrene-allyl alcohol) was obtained from Polysciences, Inc., and had a 1500 molecular weight and a 9.7% hydroxyl content (approximately 0.57 equivalents per 100 grams).

The procedure described in Example I for combining the ingredients was used, with the addition of the hydroxy-functional compound to the ingredients which mixed by hand in a plastic bag. The hydroxy-functional resin was ground in a Thomas mill to facilitate blending. The following ingredients were bag mixed:

| PMP, vinyl-polymerizable silane and additives | 100.89 parts |
|---|---|
| poly(styrene-allyl alcohol) | 1.00 parts |
| PPG Type 1156 glass fiber | 43.67 parts |

The PMP with additives was a drum tumbled mixture as described in the introduction to these examples. The mixture was compounded (designated Compound 14) and molded into test specimens as described in previous examples. The properties of the test specimens were determined using ASTM methods indicated in Table II above. Properties of test specimens molded from the resultant compound (Compound 14) are given in Table VI.

The mechanical properties of test specimens molded from Compound 14 were compared to the properties of those molded from inventive Compound 3 which did not have a hydroxy-functional additive and which was reinforced with the same type of glass fiber having the same sizing materials. This comparison of properties showing improvement attributable to use of the hydroxy-functional additive is presented in Table VI.

Example XV

This example demonstrates the use of an addition product of ethylene and "vinyl alcohol" to provide hydroxy functionality and the effect of this additive on properties of articles made from silane grafted, glass reinforced branched higher alpha-olefin polymers. The polymethylpentene used in this example was prepared, stabilized, grafted, and compounded with glass and additives as described in Example XIII. The PMP had a melt flow of 12.7 g/10 min. The glass fiber used in this example was the same as that used in Example III, i.e., one sized for use in phenolic, epoxy, DAP (diallyl phthalate), and thermoset polyester resin systems. The poly(ethylene-vinyl alcohol) copolymer was obtained from Polysciences, Inc. The poly(ethylene-vinyl alcohol) resin was 56% vinyl alcohol with approximately 21.6% hydroxyl content (approximately 1.27 equivalents per 100 grams).

The procedures described in Example I for combining the ingredients were used, with the addition of the hydroxy-functional compound to the ingredients which mixed by hand in a plastic bag. The hydroxy-functional resin was ground in a Thomas mill to facilitate blending. The following ingredients were bag mixed:

| PMP, vinyl-polymerizable silane and additives | 100.89 parts |
|---|---|
| poly(ethylene-vinyl alcohol) copolymer | 1.00 parts |
| PPG Type 1156 glass fiber | 43.67 parts |

The PMP with additives was a drum tumbled mixture as described in the introduction to these examples. The mixture was compounded (designated Compound 15) and molded into test specimens as described in previous examples. The properties of the test specimens were determined using ASTM methods indicated in Table II above. Properties of test specimens molded from the resultant compound (Compound 15) are given in Table VI.

The mechanical properties of test specimens molded from Compound 15 were compared to the properties of those molded from inventive Compound 3 which did not have a hydroxy-functional additive and which was reinforced with the same type of glass fiber having the same sizing materials. This comparison of properties showing improvement attributable to use of the hydroxy-functional additive is presented in Table VI.

In general, the results of testing of specimens made from compounds 13, 14 and 15 (shown in Table VI) demonstrate that the use of hydroxy-functional additives in silane grafted, glass reinforced PMP polymers surprisingly improves properties.

While the polymers and methods of this invention have been described in detail for the purpose of illustration, the inventive polymers and methods are not to be That which is claimed is:

1. A composition comprising:
   (a) a stereoregular polymer of a branched alpha-olefin containing 4–12 carbon atoms per molecule which has been stabilized with at least one hindered phenol;
   (b) a grafting compound selected from the group consisting of vinyl-polymerizable, unsaturated, hydrolyzable silanes; carboxylic acids; carboxylic acid derivatives; carboxylic acid anhydrides; carboxylic acid anhydride derivatives; and mixtures thereof;
   (c) a free radical generator;
   (d) glass; and
   (e) art epoxy resin which consists essentially of a condensation product of bisphenol A and epichlorohydrin.

2. A composition as recited in claim 1 wherein said stereoregular polymer of said branched alpha-olefin is selected from the group consisting of polymers of 3-methyl-1-butene; 3-methyl-1pentene; 4-methyl-1-pentene; 4-methyl-1-hexene; 3,3-dimethyl-1-butene; 4,4-dimethyl-1-hexene; 3-ethyl-1-hexene; and mixtures thereof.

3. A composition as recited in claim 2 wherein said stereoregular polymer of said branched alpha-olefin is a polymer of 4-methyl-1-pentene.

4. A composition as recited in claim 2 wherein said stereoregular polymer of said branched alpha-olefin is a polymer of 3-methyl-1-butene.

5. A composition as recited in claim 1 wherein said grafting compound is at least one vinyl-polymerizable, unsaturated, hydrolyzable silane selected from those within the formula:

$R_aSiX_bY_c$ wherein R is a monovalent hydrocarbon group, X is a silicon-bonded hydrolyzable group, Y is a silicon-bonded monovalent organic group containing at least one vinyl-polymerizable unsaturated bond, a is an integer of 0 to 2, preferably 0; b is an integer of 1 to 3, preferably 3; c is an integer of 1 to 3, preferably 1; and a+b+c is equal to 4; and
   wherein said free radical generator is an organic peroxide selected from the group of alkyl peroxides, aryl peroxides, acyl peroxides, aroyl peroxides, ketone peroxides, peroxycarbonates, peroxycarboxylates and hydroperoxides.

6. A composition as recited in claim 1 wherein said stereoregular polymer of said branched alpha-olefin is a polymer of 4-methyl-1-pentene;
   wherein said grafting compound is a vinyl-polymerizable, unsaturated, hydrolyzable silane selected from the group of 3-methacrylpropyltrimethoxysilane; vinyltrichlorosilane; vinyltriethoxysilane; vinyltrimethoxysilane; vinyltris(beta-methoxy ethoxy)silane; vinyltriacetoxysilane; 3-methacryloxypropyltris(beta-methoxyethoxy)silane; and mixtures thereof; and
   wherein said free radical generator is selected from the group os 2,5-dimethyl-2,5-di(tert-butylperoxy)-hexane; dicumyl peroxide; di-tert-butyl peroxide; 2,5-dimethyl-2,5-di(tert-butylperoxy)hexyne-3; a,a'-bis(tertbutylperoxy)diisopropylbenzene; and mixtures thereof.

7. A composition as recited in claim 1 wherein said stereoregular polymer of said branched alpha-olefin is a polymer of 3-methyl-1-butene;
   wherein said grafting compound is a vinyl-polymerizable, unsaturated, hydrolyzable silane selected from the group of 3-methacrylpropyltrimethoxysilane; vinyltrichlorosilane; vinyltriethoxysilane; vinyltrimethoxysilane; vinyltris(beta-methoxyethoxy)silane; vinyltriacetoxysilane; 3-methacryloxypropyltris(betamethoxyethoxy)silane; and mixtures thereof; and
   wherein said free radical generator is selected from the group of 2,5-dimethyl-2,5-di(tert-butylperoxy)-hexane; dicumyl peroxide; di-tert-butyl peroxide; 2,5-dimethyl-2,5-di(tert-butylperoxy)hexyne-3; a,a'-bis(tert-butylperoxy)diisopropylbenzene; and mixtures thereof.

8. A composition as recited in claim 1 wherein said grafting compound is selected from the group of carboxylic acids, carboxylic acid anhydrides, carboxylic acid derivatives, carboxylic acid anhydride derivatives; and mixtures thereof; and
   wherein said free radical generator is selected from the group of alkyl peroxides, aryl peroxides, acyl peroxides, aroyl peroxides, ketone peroxides, peroxycarbonates, peroxycarboxylates and hydroperoxides.

9. A composition as recited in claim 8 wherein said stereoregular polymer of said branched, higher alpha-olefin is a polymer of 4-methyl-1-pentene;
   wherein said grafting compound is an unsaturated carboxylic acid anhydride; and
   wherein said free radical generator is selected from the group of 2,5-dimethyl-2,5-di(tert-butylperoxy)-hexane; dicumyl peroxide; di-tert-butyl peroxide; 2,5-dimethyl-2,5-di(tert-butylperoxy)hexyne-3; a,a'-bis(tert-butylperoxy)diisopropylbenzene; and mixtures thereof.

10. A composition as recited in claim 8 wherein said stereoregular polymer of said branched alpha-olefin is a polymer of 4-methyl-1-pentene;
    wherein said grafting compound is maleic anhydride; and
    wherein said free radical generator is selected from the group of 2,5-dimethyl-2,5-di(tert-butylperoxy)-hexane; dicumyl peroxide; di-tert-butyl peroxide; 2,5-dimethyl-2,5-di(tert-butylperoxy)hexyne-3; a,a'-bis(tert-butylperoxy)diisopropylbenzene; and mixtures thereof.

11. A composition as recited in claim 8 wherein said stereoregular polymer of said branched alpha-olefin is a polymer of 3-methyl-1-butene;
    wherein said grafting compound is an unsaturated carboxylic acid anhydride; and
    wherein said free radical generator is selected from the group of 2,5-dimethyl-2,5-di(tert-butylperoxy)-hexane; dicumyl peroxide; di-tert-butyl peroxide; 2,5-dimethyl-2,5-di(tert-butylperoxy)hexyne-3; a,a'-bis(tert-butylperoxy)diisopropylbenzene; and mixtures there.

12. A composition as recited in claim 1 wherein said stereoregular polymer of branched higher alpha-olefins is a copolymer of 4-methyl-1-pentene and 1-decene.

13. An article of manufacture produced from the composition of claim 1.

14. A composition in accordance with claim 1 wherein said epoxy resin is present in the amount of about 0.05–5 parts by weight per hundred parts by weight of said stereoregular polymer of said branched alpha-olefin.

15. A composition in accordance with claim 14 wherein said stereoregular polymer of said branched alpha-olefin is a polymer of 4-methyl-1-pentene.

16. A composition in accordance with claim 14 where said stereoregular polymer of said branched alpha-olefin is a polymer of 3-methyl-1-butene.

* * * * *

UNITED STATES PATENT AND TRADEMARK OFFICE
CERTIFICATE OF CORRECTION

PATENT NO. : 5,430,079

DATED : July 4, 1995

INVENTOR(S) : Howard F. Efner et al.

It is certified that error appears in the above-indentified patent and that said Letters Patent is hereby corrected as shown below:

Claim 1, column 25, line 18, delete "art" and substitute therefor --- an ---.

Claim 6, column 25, lines 59 & 60, delete "3-methacrylpropyltrimethoxysilane" and substitute therefor --- 3-methacryloxypropyltrimethoxysilane ---.

Claim 7, column 26, lines 8 & 9, delete "3-methacrylpropyltrimethoxysilane" and substitute therefor --- 3-methacryloxypropyltrimethoxysilane ---.

Claim 11, column 26, line 63, delete "there" and substitute therefor --- thereof ---.

Signed and Sealed this

Twenty-eighth Day of November 1995

Attest:

Attesting Officer

BRUCE LEHMAN

Commissioner of Patents and Trademarks